(12) United States Patent
Hunt et al.

(10) Patent No.: US 12,604,891 B2
(45) Date of Patent: Apr. 21, 2026

(54) ANTIFOULANT MARINE STRUCTURES COMPOSITIONS AND METHODS THEREOF

(71) Applicant: THE TEXAS A&M UNIVERSITY SYSTEM, College Station, TX (US)

(72) Inventors: Emily Hunt, College Station, TX (US); Paige Dodge, College Station, TX (US); Trent Kelly, College Station, TX (US); Benton Allen, College Station, TX (US)

(73) Assignee: The Texas A&M University System, College Station, TX (US)

( * ) Notice: Subject to any disclaimer, the term of this patent is extended or adjusted under 35 U.S.C. 154(b) by 126 days.

(21) Appl. No.: 17/523,201

(22) Filed: Nov. 10, 2021

(65) Prior Publication Data

US 2022/0142153 A1     May 12, 2022

Related U.S. Application Data

(60) Provisional application No. 63/111,880, filed on Nov. 10, 2020.

(51) Int. Cl.
| | |
|---|---|
| *A01N 25/10* | (2006.01) |
| *A01N 59/00* | (2006.01) |
| *A01N 59/06* | (2006.01) |
| *A01N 59/16* | (2006.01) |
| *A01N 59/20* | (2006.01) |
| *A01P 1/00* | (2006.01) |

(52) U.S. Cl.
CPC ............. *A01N 25/10* (2013.01); *A01N 59/00* (2013.01); *A01N 59/06* (2013.01); *A01N 59/16* (2013.01); *A01N 59/20* (2013.01); *A01P 1/00* (2021.08)

(58) Field of Classification Search
CPC ........................................................ A01P 1/00
See application file for complete search history.

(56) References Cited

U.S. PATENT DOCUMENTS

| | | | | |
|---|---|---|---|---|
| 6,280,759 | B1 * | 8/2001 | Price ...................... | A01N 25/28 |
| | | | | 424/408 |
| 2005/0048218 | A1 * | 3/2005 | Weidman ................. | B05D 1/08 |
| | | | | 427/446 |
| 2007/0053950 | A1 * | 3/2007 | Gajanan .................. | A01N 25/34 |
| | | | | 424/408 |

FOREIGN PATENT DOCUMENTS

| | | | | |
|---|---|---|---|---|
| JP | 2000351941 A | * 12/2000 | ........... | C09D 183/04 |
| WO | WO-2017167909 A1 | * 10/2017 | ............... | B32B 3/30 |

OTHER PUBLICATIONS

Anasuya Roy et al, Antimicrobial performance of polyethylene nanocomposite monofilaments reinforced with metal nanoparticles decorated montmorillonite, Colloids and Surfaces B: Biointerfaces 178 (2019) 87-93 (Year: 2019).*
BPF, Arpro, British Plastics Federation, Thermoplastics, downloaded in Sep. 2023 (Year: 2023).*
JP2000351941A, Google English Translation, downloaded in Nov. 2024 (Year: 2024).*

* cited by examiner

*Primary Examiner* — Robert A Wax
(74) *Attorney, Agent, or Firm* — Barnes & Thornburg LLP

(57) ABSTRACT

The invention relates to antifoulant compositions comprising i) an antimicrobial composition and ii) one or more polymers as well as antifoulant compositions comprising i) an antimicrobial composition and ii) one or more composite materials. The invention includes the antifoulant compositions, methods for making the antifoulant compositions, and methods of reducing presence of a fouling organism on a surface of a composition utilizing the antifoulant compositions.

20 Claims, 10 Drawing Sheets

ANTIFOULANT MARINE STRUCTURES COMPOSITIONS AND METHODS THEREOF

CROSS-REFERENCE TO RELATED APPLICATIONS

This application claims the benefit under 35 USC § 119(e) of U.S. Provisional Application Ser. No. 63/111,880, filed on Nov. 10, 2020, the entire disclosure of which is incorporated herein by reference.

TECHNICAL FIELD

The invention relates to antifoulant compositions comprising i) an antimicrobial composition and ii) one or more polymers as well as antifoulant compositions comprising i) an antimicrobial composition and ii) one or more composite materials. The invention includes the antifoulant compositions, methods for making the antifoulant compositions, and methods of reducing presence of a fouling organism on a surface of a composition utilizing the antifoulant compositions.

BACKGROUND AND SUMMARY OF THE INVENTION

Microbes are a pervasive threat in the oil and gas industry and often result in microbiologically influenced corrosion (MIC). In particular, microbes can form harmful biofilms via group formation and attachment on a variety of surfaces including piping, aquatic structures, medical equipment, and even teeth (plaque). Biofilms will begin to react with the surface of attachment and a deterioration process will then take place. MIC is well documented in substrates exposed to a variety of aqueous environments including seawater, freshwater, soils, and fuels.

Biocorrosion, also known as biofouling, is a related phenomenon that occurs when surfaces interact with natural environments such as soil and water. Biofouling occurs when a biofilm develops and marine life begins to attach to a surface, thus causing blockages or growths that comprise microorganisms, algae, plants, and even animals. Biofouling accounts for up to 20% of all corrosion costs and increases cost of operation by escalating drag and weight, thus resulting in higher fuel costs and less efficiency as well as the additional cost to remove the buildup on surfaces on a regular basis.

Current practices to address undesirable biofouling include treating surfaces with an antifouling paint or coating. Typically, antifouling paints contain biocides that repel fouling organisms when released at a controlled rate into the water adjacent to the structure. The rate of release of biocides is critical for efficacy. If release is too fast, the antifouling will fail prematurely, especially after a period of intense activity. However, if release is too slow, the antifouling will be ineffective, particularly in areas with a high fouling challenge. The most important aspect for biofouling is to prevent organisms from attaching and growing on the surface because after this takes place, growth can be extremely rapid and the organisms are beyond the influence of antifouling paints/coating, and can only be removed by scrubbing and scraping by underwater divers which is both costly and time consuming.

Therefore, there exists a need for new compositions and methods for MIC and fouling remediation, especially means for long-term, more environmentally conscious methods to mitigate and control biofilm development. Accordingly, the present disclosure provides antifoulant compositions and methods thereof that exhibit desirable properties and provide related benefits over known practices.

The present disclosure provides antifoulant compositions comprising an antimicrobial composition and one or more polymers, as well as antifoulant compositions comprising an antimicrobial composition and one or more composite materials. The disclosure also provides methods of making the antifoulant compositions as methods of reducing presence of a fouling organism on a surface of a composition utilizing the antifoulant compositions.

The antifoulant compositions and methods according to the present disclosure provide several benefits. First, the antifoulant compositions are affective against many different microbes and microorganisms, including gram positive and gram negative bacteria and barnacles. Second, the antifoulant compositions provide long-term efficacy in preventing biofouling. Third, the antifoulant compositions provide an alternative to expensive coatings and toxic chemicals and presents a long term solution to address this important problem.

In illustrative embodiments, an antifoulant composition is provided. For these embodiments, the antifoulant composition comprises i) an antimicrobial composition and ii) one or more polymers.

In illustrative embodiments, another antifoulant composition is provided. For these embodiments, the antifoulant composition comprises i) an antimicrobial composition and ii) one or more composite materials.

In illustrative embodiments, a method of reducing presence of a fouling organism on a surface of a composition is provided. For these embodiments, the method comprises the step of placing the composition in a liquid, wherein the composition is configured to reduce presence of the fouling organism on the surface of the composition.

In illustrative embodiments, a method of making an antifoulant composition is provided. For these embodiments, the method comprises the step of combining an antimicrobial composition and one or more polymers and molding the antifoulant composition from the combination of the antimicrobial composition and the polymer.

In illustrative embodiments, another method of making an antifoulant composition is provided. For these embodiments, the method comprises the step of combining an antimicrobial composition and one or more composite materials and molding the antifoulant composition from the combination of the antimicrobial composition and the composite material.

DETAILED DESCRIPTION

Figure 1:
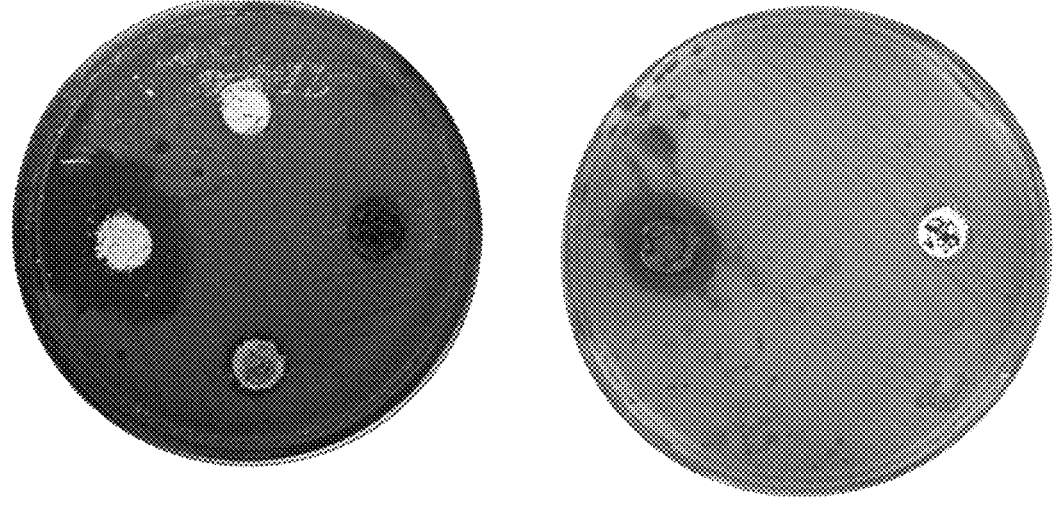
FIG. 1 shows agar diffusion tests on *E. coli* for various antimicrobial compositions.

In an illustrative aspect, an antifoulant composition is provided. The antifoulant composition comprises i) an antimicrobial composition and ii) one or more polymers.

In an embodiment, the antimicrobial composition comprises zinc. In an embodiment, the antimicrobial composition comprises zinc oxide. In an embodiment, the antimicrobial composition comprises copper. In an embodiment, the antimicrobial composition comprises silver. In an embodiment, the antimicrobial composition comprises alumina. In an embodiment, the antimicrobial composition comprises cuprous oxide. In an embodiment, the antimicrobial composition comprises cupric oxide. In an embodiment, the antimicrobial composition comprises an ingredient selected from the group consisting of zinc oxide, silver, alumina, cuprous oxide, cupric oxide, and any combination thereof.

In an embodiment, the antimicrobial composition is present at a concentration between 0.1% to 40% (w/w). In an embodiment, the antimicrobial composition is present at a concentration between 0.1% to 10% (w/w). In an embodiment, the antimicrobial composition is present at a concentration of 10% (w/w). In an embodiment, the antimicrobial composition is present at a concentration between 1% to 10% (w/w). In an embodiment, the antimicrobial composition is present at a concentration between 10% to 20% (w/w). In an embodiment, the antimicrobial composition is present at a concentration between 20% to 30% (w/w). In an embodiment, the antimicrobial composition is present at a concentration between 30% to 40% (w/w).

In an embodiment, the polymer comprises a thermoplastic polymer. In an embodiment, the polymer comprises an extruded polymer.

In an embodiment, the polymer comprises polyacrylic acid (PAA), poly(methyl methacrylate) (PMMA), acrylonitrile butadiene styrene (ABS), polyamide, polylactic acid (PLA), polybenzimidazole (PBI), polycarbonate (PC), polyether sulfone (PES), polyoxymethylene (POM), polyether ether ketone (PEEK), polyetherimide (PEI), polyphenylene oxide (PPO), polyphenylene sulfide (PPS), polypropylene (PP), polystyrene (PS), polyvinyl chloride (PVC), polyvinylidene fluoride (PVDF), polytetrafluoroethylene (PTFE), and any combination thereof.

In an embodiment, the polymer comprises polyethylene. In an embodiment, the polymer comprises high density polyethylene (HDPE). In an embodiment, the polymer comprises low density polyethylene (LDPE). In an embodiment, the polymer comprises polyacrylic acid (PAA). In an embodiment, the polymer comprises poly(methyl methacrylate) (PMMA). In an embodiment, the polymer comprises acrylonitrile butadiene styrene (ABS). In an embodiment, the polymer comprises polyamide. In an embodiment, the polymer comprises polylactic acid (PLA). In an embodiment, the polymer comprises polybenzimidazole (PBI). In an embodiment, the polymer comprises polycarbonate (PC). In an embodiment, the polymer comprises polyether sulfone (PES). In an embodiment, the polymer comprises polyoxymethylene (POM). In an embodiment, the polymer comprises polyether ether ketone (PEEK). In an embodiment, the polymer comprises polyetherimide (PEI). In an embodiment, the polymer comprises polyphenylene oxide (PPO). In an embodiment, the polymer comprises polyphenylene sulfide (PPS). In an embodiment, the polymer comprises polypropylene (PP). In an embodiment, the polymer comprises polystyrene (PS). In an embodiment, the polymer comprises polyvinyl chloride (PVC). In an embodiment, the polymer comprises polyvinylidene fluoride (PVDF). In an embodiment, the polymer comprises polytetrafluoroethylene (PTFE).

In another illustrative aspect, another antifoulant composition is provided. The antifoulant composition comprises i) an antimicrobial composition and ii) one or more composite materials.

In an embodiment, the antimicrobial composition comprises zinc. In an embodiment, the antimicrobial composition comprises zinc oxide. In an embodiment, the antimicrobial composition comprises copper. In an embodiment, the antimicrobial composition comprises silver. In an embodiment, the antimicrobial composition comprises alumina. In an embodiment, the antimicrobial composition comprises cuprous oxide. In an embodiment, the antimicrobial composition comprises cupric oxide. In an embodiment, the antimicrobial composition comprises an ingredient selected from the group consisting of zinc oxide, silver, alumina, cuprous oxide, cupric oxide, and any combination thereof.

In an embodiment, the antimicrobial composition is present at a concentration between 0.1% to 40% (w/w). In an embodiment, the antimicrobial composition is present at a concentration between 0.1% to 10% (w/w). In an embodiment, the antimicrobial composition is present at a concentration of 10% (w/w). In an embodiment, the antimicrobial composition is present at a concentration between 1% to 10% (w/w). In an embodiment, the antimicrobial composition is present at a concentration between 10% to 20% (w/w). In an embodiment, the antimicrobial composition is present at a concentration between 20% to 30% (w/w). In an embodiment, the antimicrobial composition is present at a concentration between 30% to 40% (w/w).

In an embodiment, the composite material comprises an epoxy-based composite. In an embodiment, the composite material comprises a resin-based composite. In an embodiment, the composite material comprises a carbon fiber. In an embodiment, the composite material comprises a fiber-reinforced plastic. In an embodiment, the composite material comprises fiberglass.

In an embodiment, the fiber-reinforced plastic comprises a polymer matrix and fibers. In an embodiment, the polymer matrix comprises a thermoset polymer. In an embodiment, the polymer matrix comprises a polyester resin, a polyurethane, vulcanized rubber, duroplast, a melamine resin, diallyl-phthalate (DAP), an epoxy resin, a benzoxazine, a polyimide, a cyanate ester, furan, thiolyte, a vinyl ester resin, and any combination thereof.

In an embodiment, the polymer matrix comprises a polyester resin. In an embodiment, the polymer matrix comprises a polyurethane. In an embodiment, the polymer matrix comprises vulcanized rubber. In an embodiment, the polymer matrix comprises duroplast. In an embodiment, the polymer matrix comprises a melamine resin. In an embodiment, the polymer matrix comprises diallyl-phthalate (DAP). In an embodiment, the polymer matrix comprises an epoxy resin. In an embodiment, the polymer matrix comprises a benzoxazine. In an embodiment, the polymer matrix comprises a polyimide. In an embodiment, the polymer matrix comprises a cyanate ester. In an embodiment, the polymer matrix comprises furan. In an embodiment, the polymer matrix comprises thiolyte. In an embodiment, the polymer matrix comprises a vinyl ester resin.

In an embodiment, the fibers comprise glass, carbon, aramid, basalt, and any combination thereof. In an embodiment, the fibers comprise glass. In an embodiment, the fibers comprise carbon. In an embodiment, the fibers comprise aramid. In an embodiment, the fibers comprise basalt.

In another illustrative aspect, a method of reducing presence of a fouling organism on a surface of a composition is provided. The method comprises the step of placing the composition in a liquid, wherein the composition is configured to reduce presence of the fouling organism on the surface of the composition.

In an embodiment, the fouling organism is a bacteria. In an embodiment, the bacteria is a Gram positive bacteria. In an embodiment, the bacteria is a Gram negative bacteria. In an embodiment, the bacteria is a spore forming bacteria. In an embodiment, the bacteria is a *Staphylococcus* bacteria. In an embodiment, the bacteria is *Staphylococcus aureus*. In an embodiment, the bacteria is an *Escherichia* bacteria. In an embodiment, the bacteria is *Escherichia coli*.

In an embodiment, the fouling organism is a fungus. In an embodiment, the fungus is selected from the group consisting of *Aspergillus, Chrysosporium, Fusarium, Scedosporium, Scytalidium, Scopulariopsis, Candida, Penicillium, Rhodotorula, Cladosporium, Mucor, Stachybotrys, Phialemonium, Trichophyton, Microsporum*, and any combination thereof.

In an embodiment, the fouling organism is an animal. In an embodiment, the fouling organism is a mollusk. In an embodiment, the mollusk is an oyster. In an embodiment, the fouling organism is an arthropod. In an embodiment, the arthropod is a barnacle.

In an embodiment, the surface of the composition is underwater. In an embodiment, the liquid comprises salt water. In an embodiment, the liquid comprises fresh water.

In an embodiment, the surface of the composition is substantially free of an external coating. As used herein, the term "substantially free" refers to zero or nearly no detectable amount of a material, quantity, or item. For example, the amount can be less than 2 percent, less than 0.5 percent, less than 0.1 percent, or less than 0.01 percent of the material, quantity, or item. In an embodiment, the surface of the composition is substantially free of an external coating that comprises an antifoulant coating.

In an embodiment, the method reduces the presence of the fouling organism for at least 20 days. In an embodiment, the method reduces the presence of the fouling organism for at least 30 days. In an embodiment, the method reduces the presence of the fouling organism for at least 40 days. In an embodiment, the method reduces the presence of the fouling organism for at least 50 days. In an embodiment, the method reduces the presence of the fouling organism for at least 60 days. In an embodiment, the method reduces the presence of the fouling organism for at least 80 days. In an embodiment, the method reduces the presence of the fouling organism for at least 90 days. In an embodiment, the method reduces the presence of the fouling organism for at least 100 days. In an embodiment, the method reduces the presence of the fouling organism for at least 120 days.

In an embodiment, the method is evaluated via ASTM D-3623-78a. This ASTM procedure is well known to the skilled artisan.

In an embodiment, the composition is an antifoulant composition comprising i) an antimicrobial composition and ii) one or more polymers. The previously described embodiments of the antifoulant composition comprising an antimicrobial composition and one or more polymers are applicable to the method of method of reducing presence of a fouling organism on a surface of a composition described herein.

In an embodiment, the composition is an antifoulant composition comprising i) an antimicrobial composition and ii) one or more composite materials. The previously described embodiments of the antifoulant composition comprising an antimicrobial composition and one or more composite materials are applicable to the method of method of reducing presence of a fouling organism on a surface of a composition described herein.

In another illustrative aspect, a method of making an antifoulant composition is provided. The method comprises the step of combining an antimicrobial composition and one or more polymers and molding the antifoulant composition from the combination of the antimicrobial composition and the polymer.

In an embodiment, the antimicrobial composition is a powder. In an embodiment, the polymer is a powder.

In an embodiment, the combination of the antimicrobial composition and the polymer is performed prior to curing the antifoulant composition. In an embodiment, the molding is performed via a rotational molding composition. In an embodiment, the molding is performed via extrusion.

The previously described embodiments of the antifoulant composition comprising an antimicrobial composition and one or more polymers are applicable to this method of making an antifoulant composition as described herein.

In another illustrative aspect, another method of making an antifoulant composition is provided. The method comprises the step of combining an antimicrobial composition and one or more composite materials and molding the antifoulant composition from the combination of the antimicrobial composition and the composite material.

In an embodiment, the antimicrobial composition is a powder. In an embodiment, the composite material is a liquid. In an embodiment, the combination of the antimicrobial composition and the composite material is performed prior to curing the antifoulant composition.

The previously described embodiments of the antifoulant composition comprising an antimicrobial composition and one or more composite materials are applicable to this method of making an antifoulant composition as described herein.

The following numbered embodiments are contemplated and are non-limiting:

1. An antifoulant composition comprising i) an antimicrobial composition and ii) one or more polymers.

2. The antifoulant composition of clause 1, any other suitable clause, or any combination of suitable clauses, wherein the antimicrobial composition comprises zinc.

3. The antifoulant composition of clause 1, any other suitable clause, or any combination of suitable clauses, wherein the antimicrobial composition comprises zinc oxide.

4. The antifoulant composition of clause 1, any other suitable clause, or any combination of suitable clauses, wherein the antimicrobial composition comprises copper.

5. The antifoulant composition of clause 1, any other suitable clause, or any combination of suitable clauses, wherein the antimicrobial composition comprises silver.

6. The antifoulant composition of clause 1, any other suitable clause, or any combination of suitable clauses, wherein the antimicrobial composition comprises alumina.

7. The antifoulant composition of clause 1, any other suitable clause, or any combination of suitable clauses, wherein the antimicrobial composition comprises cuprous oxide.

8. The antifoulant composition of clause 1, any other suitable clause, or any combination of suitable clauses, wherein the antimicrobial composition comprises cupric oxide.

9. The antifoulant composition of clause 1, any other suitable clause, or any combination of suitable clauses, wherein the antimicrobial composition comprises an ingredient selected from the group consisting of zinc oxide, silver, alumina, cuprous oxide, cupric oxide, and any combination thereof.

10. The antifoulant composition of clause 1, any other suitable clause, or any combination of suitable clauses, wherein the antimicrobial composition is present at a concentration between 0.1% to 40% (w/w).

11. The antifoulant composition of clause 1, any other suitable clause, or any combination of suitable clauses, wherein the antimicrobial composition is present at a concentration between 0.1% to 10% (w/w).

12. The antifoulant composition of clause 1, any other suitable clause, or any combination of suitable clauses, wherein the antimicrobial composition is present at a concentration of 10% (w/w).

13. The antifoulant composition of clause 1, any other suitable clause, or any combination of suitable clauses, wherein the antimicrobial composition is present at a concentration between 1% to 10% (w/w).

14. The antifoulant composition of clause 1, any other suitable clause, or any combination of suitable clauses, wherein the antimicrobial composition is present at a concentration between 10% to 20% (w/w).

15. The antifoulant composition of clause 1, any other suitable clause, or any combination of suitable clauses, wherein the antimicrobial composition is present at a concentration between 20% to 30% (w/w).

16. The antifoulant composition of clause 1, any other suitable clause, or any combination of suitable clauses, wherein the antimicrobial composition is present at a concentration between 30% to 40% (w/w).

17. The antifoulant composition of clause 1, any other suitable clause, or any combination of suitable clauses, wherein the polymer comprises a thermoplastic polymer.

18. The antifoulant composition of clause 1, any other suitable clause, or any combination of suitable clauses, wherein the polymer comprises an extruded polymer.

19. The antifoulant composition of clause 1, any other suitable clause, or any combination of suitable clauses, wherein the polymer comprises polyacrylic acid (PAA), poly(methyl methacrylate) (PMMA), acrylonitrile butadiene styrene (ABS), polyamide, polylactic acid (PLA), polybenzimidazole (PBI), polycarbonate (PC), polyether sulfone (PES), polyoxymethylene (POM), polyether ether ketone (PEEK), polyetherimide (PEI), polyphenylene oxide (PPO), polyphenylene sulfide (PPS), polypropylene (PP), polystyrene (PS), polyvinyl chloride (PVC), polyvinylidene fluoride (PVDF), polytetrafluoroethylene (PTFE), and any combination thereof.

20. The antifoulant composition of clause 1, any other suitable clause, or any combination of suitable clauses, wherein the polymer comprises polyethylene.

21. The antifoulant composition of clause 1, any other suitable clause, or any combination of suitable clauses, wherein the polymer comprises high density polyethylene (HDPE).

22. The antifoulant composition of clause 1, any other suitable clause, or any combination of suitable clauses, wherein the polymer comprises low density polyethylene (LDPE).

23. The antifoulant composition of clause 1, any other suitable clause, or any combination of suitable clauses, wherein the polymer comprises polyacrylic acid (PAA).

24. The antifoulant composition of clause 1, any other suitable clause, or any combination of suitable clauses, wherein the polymer comprises poly(methyl methacrylate) (PMMA).

25. The antifoulant composition of clause 1, any other suitable clause, or any combination of suitable clauses, wherein the polymer comprises acrylonitrile butadiene styrene (ABS).

26. The antifoulant composition of clause 1, any other suitable clause, or any combination of suitable clauses, wherein the polymer comprises polyamide.

27. The antifoulant composition of clause 1, any other suitable clause, or any combination of suitable clauses, wherein the polymer comprises polylactic acid (PLA).

28. The antifoulant composition of clause 1, any other suitable clause, or any combination of suitable clauses, wherein the polymer comprises polybenzimidazole (PBI).

29. The antifoulant composition of clause 1, any other suitable clause, or any combination of suitable clauses, wherein the polymer comprises polycarbonate (PC).

30. The antifoulant composition of clause 1, any other suitable clause, or any combination of suitable clauses, wherein the polymer comprises polyether sulfone (PES).

31. The antifoulant composition of clause 1, any other suitable clause, or any combination of suitable clauses, wherein the polymer comprises polyoxymethylene (POM).

32. The antifoulant composition of clause 1, any other suitable clause, or any combination of suitable clauses, wherein the polymer comprises polyether ether ketone (PEEK).

33. The antifoulant composition of clause 1, any other suitable clause, or any combination of suitable clauses, wherein the polymer comprises polyetherimide (PEI).

34. The antifoulant composition of clause 1, any other suitable clause, or any combination of suitable clauses, wherein the polymer comprises polyphenylene oxide (PPO).

35. The antifoulant composition of clause 1, any other suitable clause, or any combination of suitable clauses, wherein the polymer comprises polyphenylene sulfide (PPS).

36. The antifoulant composition of clause 1, any other suitable clause, or any combination of suitable clauses, wherein the polymer comprises polypropylene (PP).

37. The antifoulant composition of clause 1, any other suitable clause, or any combination of suitable clauses, wherein the polymer comprises polystyrene (PS).

38. The antifoulant composition of clause 1, any other suitable clause, or any combination of suitable clauses, wherein the polymer comprises polyvinyl chloride (PVC).

39. The antifoulant composition of clause 1, any other suitable clause, or any combination of suitable clauses, wherein the polymer comprises polyvinylidene fluoride (PVDF).

40. The antifoulant composition of clause 1, any other suitable clause, or any combination of suitable clauses, wherein the polymer comprises polytetrafluoroethylene (PTFE).

41. An antifoulant composition comprising i) an antimicrobial composition and ii) one or more composite materials.

42. The antifoulant composition of clause 41, any other suitable clause, or any combination of suitable clauses, wherein the antimicrobial composition comprises zinc.

43. The antifoulant composition of clause 41, any other suitable clause, or any combination of suitable clauses, wherein the antimicrobial composition comprises zinc oxide.

44. The antifoulant composition of clause 41, any other suitable clause, or any combination of suitable clauses, wherein the antimicrobial composition comprises copper.

45. The antifoulant composition of clause 41, any other suitable clause, or any combination of suitable clauses, wherein the antimicrobial composition comprises silver.

46. The antifoulant composition of clause 41, any other suitable clause, or any combination of suitable clauses, wherein the antimicrobial composition comprises alumina.

47. The antifoulant composition of clause 41, any other suitable clause, or any combination of suitable clauses, wherein the antimicrobial composition comprises cuprous oxide.

48. The antifoulant composition of clause 41, any other suitable clause, or any combination of suitable clauses, wherein the antimicrobial composition comprises cupric oxide.

49. The antifoulant composition of clause 41, any other suitable clause, or any combination of suitable clauses, wherein the antimicrobial composition comprises an ingredient selected from the group consisting of zinc oxide, silver, alumina, cuprous oxide, cupric oxide, and any combination thereof.

50. The antifoulant composition of clause 41, any other suitable clause, or any combination of suitable clauses, wherein the antimicrobial composition is present at a concentration between 0.1% to 40% (w/w).

51. The antifoulant composition of clause 41, any other suitable clause, or any combination of suitable clauses, wherein the antimicrobial composition is present at a concentration between 0.1% to 10% (w/w).

52. The antifoulant composition of clause 41, any other suitable clause, or any combination of suitable clauses, wherein the antimicrobial composition is present at a concentration of 10% (w/w).

53. The antifoulant composition of clause 41, any other suitable clause, or any combination of suitable clauses, wherein the antimicrobial composition is present at a concentration between 1% to 10% (w/w).

54. The antifoulant composition of clause 41, any other suitable clause, or any combination of suitable clauses, wherein the antimicrobial composition is present at a concentration between 10% to 20% (w/w).

55. The antifoulant composition of clause 41, any other suitable clause, or any combination of suitable clauses, wherein the antimicrobial composition is present at a concentration between 20% to 30% (w/w).

56. The antifoulant composition of clause 41, any other suitable clause, or any combination of suitable clauses, wherein the antimicrobial composition is present at a concentration between 30% to 40% (w/w).

57. The antifoulant composition of clause 41, any other suitable clause, or any combination of suitable clauses, wherein the composite material comprises an epoxy-based composite.

58. The antifoulant composition of clause 41, any other suitable clause, or any combination of suitable clauses, wherein the composite material comprises a resin-based composite.

59. The antifoulant composition of clause 41, any other suitable clause, or any combination of suitable clauses, wherein the composite material comprises a carbon fiber.

60. The antifoulant composition of clause 41, any other suitable clause, or any combination of suitable clauses, wherein the composite material comprises a fiber-reinforced plastic.

61. The antifoulant composition of clause 60, any other suitable clause, or any combination of suitable clauses, wherein the fiber-reinforced plastic comprises a polymer matrix and fibers.

62. The antifoulant composition of clause 61, any other suitable clause, or any combination of suitable clauses, wherein the polymer matrix comprises a thermoset polymer.

63. The antifoulant composition of clause 61, any other suitable clause, or any combination of suitable clauses, wherein the polymer matrix comprises a polyester resin, a polyurethane, vulcanized rubber, duroplast, a melamine resin, diallyl-phthalate (DAP), an epoxy resin, a benzoxazine, a polyimide, a cyanate ester, furan, thiolyte, a vinyl ester resin, and any combination thereof.

64. The antifoulant composition of clause 61, any other suitable clause, or any combination of suitable clauses, wherein the polymer matrix comprises a polyester resin.

65. The antifoulant composition of clause 61, any other suitable clause, or any combination of suitable clauses, wherein the polymer matrix comprises a polyurethane.

66. The antifoulant composition of clause 61, any other suitable clause, or any combination of suitable clauses, wherein the polymer matrix comprises vulcanized rubber.

67. The antifoulant composition of clause 61, any other suitable clause, or any combination of suitable clauses, wherein the polymer matrix comprises duroplast.

68. The antifoulant composition of clause 61, any other suitable clause, or any combination of suitable clauses, wherein the polymer matrix comprises a melamine resin.

69. The antifoulant composition of clause 61, any other suitable clause, or any combination of suitable clauses, wherein the polymer matrix comprises diallyl-phthalate (DAP).

70. The antifoulant composition of clause 61, any other suitable clause, or any combination of suitable clauses, wherein the polymer matrix comprises an epoxy resin.

71. The antifoulant composition of clause 61, any other suitable clause, or any combination of suitable clauses, wherein the polymer matrix comprises a benzoxazine.

72. The antifoulant composition of clause 61, any other suitable clause, or any combination of suitable clauses, wherein the polymer matrix comprises a polyimide.

73. The antifoulant composition of clause 61, any other suitable clause, or any combination of suitable clauses, wherein the polymer matrix comprises a cyanate ester.

74. The antifoulant composition of clause 61, any other suitable clause, or any combination of suitable clauses, wherein the polymer matrix comprises furan.

75. The antifoulant composition of clause 61, any other suitable clause, or any combination of suitable clauses, wherein the polymer matrix comprises thiolyte.

76. The antifoulant composition of clause 61, any other suitable clause, or any combination of suitable clauses, wherein the polymer matrix comprises a vinyl ester resin.

77. The antifoulant composition of clause 61, any other suitable clause, or any combination of suitable clauses, wherein the fibers comprise glass, carbon, aramid, basalt, and any combination thereof.

78. The antifoulant composition of clause 61, any other suitable clause, or any combination of suitable clauses, wherein the fibers comprise glass.

79. The antifoulant composition of clause 61, any other suitable clause, or any combination of suitable clauses, wherein the fibers comprise carbon.

80. The antifoulant composition of clause 61, any other suitable clause, or any combination of suitable clauses, wherein the fibers comprise aramid.

81. The antifoulant composition of clause 61, any other suitable clause, or any combination of suitable clauses, wherein the fibers comprise basalt.

82. The antifoulant composition of clause 41, any other suitable clause, or any combination of suitable clauses, wherein the composite material comprises fiberglass.

83. A method of reducing presence of a fouling organism on a surface of a composition, said method comprising the step of placing the composition in a liquid, wherein the composition is configured to reduce presence of the fouling organism on the surface of the composition.

84. The method of clause 83, wherein the fouling organism is a bacteria.

85. The method of clause 84, wherein the bacteria is a Gram positive bacteria.

86. The method of clause 84, wherein the bacteria is a Gram negative bacteria.

87. The method of clause 84, wherein the bacteria is a spore forming bacteria.

88. The method of clause 84, wherein the bacteria is a *Staphylococcus* bacteria.

89. The method of clause 84, wherein the bacteria is *Staphylococcus aureus*.

90. The method of clause 84, wherein the bacteria is an *Escherichia* bacteria.

91. The method of clause 84, wherein the bacteria is *Escherichia coli*.

92. The method of clause 83, wherein the fouling organism is a fungus.

93. The method of clause 92, wherein the fungus is selected from the group consisting of *Aspergillus, Chrysosporium, Fusarium, Scedosporium, Scytalidium, Scopulariopsis, Candida, Penicillium, Rhodotorula, Cladosporium, Mucor, Stachybotrys, Phialemonium, Trichophyton, Microsporum*, and any combination thereof.

94. The method of clause 83, wherein the fouling organism is an animal.

95. The method of clause 83, wherein the fouling organism is a mollusk.

96. The method of clause 95, wherein the mollusk is an oyster.

97. The method of clause 83, wherein the fouling organism is an arthropod.

98. The method of clause 97, wherein the arthropod is a barnacle.

99. The method of clause 83, wherein the surface of the composition is underwater.

100. The method of clause 83, wherein the liquid comprises salt water.

101. The method of clause 83, wherein the liquid comprises fresh water.

102. The method of clause 83, wherein the surface of the composition is substantially free of an external coating.

103. The method of clause 83, wherein the surface of the composition is substantially free of an external coating that comprises an antifoulant coating.

104. The method of clause 83, wherein the method reduces the presence of the fouling organism for at least 20 days.

105. The method of clause 83, wherein the method reduces the presence of the fouling organism for at least 30 days.

106. The method of clause 83, wherein the method reduces the presence of the fouling organism for at least 40 days.

107. The method of clause 83, wherein the method reduces the presence of the fouling organism for at least 50 days.

108. The method of clause 83, wherein the method reduces the presence of the fouling organism for at least 60 days.

109. The method of clause 83, wherein the method reduces the presence of the fouling organism for at least 80 days.

110. The method of clause 83, wherein the method reduces the presence of the fouling organism for at least 90 days.

111. The method of clause 83, wherein the method reduces the presence of the fouling organism for at least 100 days.

112. The method of clause 83, wherein the method reduces the presence of the fouling organism for at least 120 days.

113. The method of clause 83, wherein the method is evaluated via ASTM D-3623-78a.

114. The method of clause 83, wherein the composition is an antifoulant composition comprising i) an antimicrobial composition and ii) one or more polymers.

115. The method of clause 114, wherein the antimicrobial composition comprises zinc.

116. The method of clause 114, wherein the antimicrobial composition comprises zinc oxide.

117. The method of clause 114, wherein the antimicrobial composition comprises copper.

118. The method of clause 114, wherein the antimicrobial composition comprises silver.

119. The method of clause 114, wherein the antimicrobial composition comprises alumina.

120. The method of clause 114, wherein the antimicrobial composition comprises cuprous oxide.

121. The method of clause 114, wherein the antimicrobial composition comprises cupric oxide.

122. The method of clause 114, wherein the antimicrobial composition comprises an ingredient selected from the group consisting of zinc oxide, silver, alumina, cuprous oxide, cupric oxide, and any combination thereof.

123. The method of clause 114, wherein the antimicrobial composition is present at a concentration between 0.1% to 40% (w/w).

124. The method of clause 114, wherein the antimicrobial composition is present at a concentration between 0.1% to 10% (w/w).

125. The method of clause 114, wherein the antimicrobial composition is present at a concentration of 10% (w/w).

126. The method of clause 114, wherein the antimicrobial composition is present at a concentration between 1% to 10% (w/w).

127. The method of clause 114, wherein the antimicrobial composition is present at a concentration between 10% to 20% (w/w).

128. The method of clause 114, wherein the antimicrobial composition is present at a concentration between 20% to 30% (w/w).

129. The method of clause 114, wherein the antimicrobial composition is present at a concentration between 30% to 40% (w/w).

130. The method of clause 114, wherein the polymer comprises a thermoplastic polymer.

131. The method of clause 114, wherein the polymer comprises an extruded polymer.

132. The method of clause 114, wherein the polymer comprises polyacrylic acid (PAA), poly(methyl methacrylate) (PMMA), acrylonitrile butadiene styrene (ABS), polyamide, polylactic acid (PLA), polybenzimidazole (PBI), polycarbonate (PC), polyether sulfone (PES), polyoxymethylene (POM), polyether ether ketone (PEEK), polyetherimide (PEI), polyphenylene oxide (PPO), polyphenylene sulfide (PPS), polypropylene (PP), polystyrene (PS), polyvinyl chloride (PVC), polyvinylidene fluoride (PVDF), polytetrafluoroethylene (PTFE), and any combination thereof.

133. The method of clause 114, wherein the polymer comprises polyethylene.

134. The method of clause 114, wherein the polymer comprises high density polyethylene (HDPE).

135. The method of clause 114, wherein the polymer comprises low density polyethylene (LDPE).

136. The method of clause 114, wherein the polymer comprises polyacrylic acid (PAA).

137. The method of clause 114, wherein the polymer comprises poly(methyl methacrylate) (PMMA).

138. The method of clause 114, wherein the polymer comprises acrylonitrile butadiene styrene (ABS).

139. The method of clause 114, wherein the polymer comprises polyamide.

140. The method of clause 114, wherein the polymer comprises polylactic acid (PLA).

141. The method of clause 114, wherein the polymer comprises polybenzimidazole (PBI).

142. The method of clause 114, wherein the polymer comprises polycarbonate (PC).

143. The method of clause 114, wherein the polymer comprises polyether sulfone (PES).

144. The method of clause 114, wherein the polymer comprises polyoxymethylene (POM).

145. The method of clause 114, wherein the polymer comprises polyether ether ketone (PEEK).

146. The method of clause 114, wherein the polymer comprises polyetherimide (PEI).

147. The method of clause 114, wherein the polymer comprises polyphenylene oxide (PPO).

148. The method of clause 114, wherein the polymer comprises polyphenylene sulfide (PPS).

149. The method of clause 114, wherein the polymer comprises polypropylene (PP).

150. The method of clause 114, wherein the polymer comprises polystyrene (PS).

151. The method of clause 114, wherein the polymer comprises polyvinyl chloride (PVC).

152. The method of clause 114, wherein the polymer comprises polyvinylidene fluoride (PVDF).

153. The method of clause 114, wherein the polymer comprises polytetrafluoroethylene (PTFE).

154. The method of clause 83, wherein the composition is an antifoulant composition comprising i) an antimicrobial composition and ii) one or more composite materials.

155. The method of clause 154, wherein the antimicrobial composition comprises zinc.

156. The method of clause 154, wherein the antimicrobial composition comprises zinc oxide.

157. The method of clause 154, wherein the antimicrobial composition comprises copper.

158. The method of clause 154, wherein the antimicrobial composition comprises silver.

159. The method of clause 154, wherein the antimicrobial composition comprises alumina.

160. The method of clause 154, wherein the antimicrobial composition comprises cuprous oxide.

161. The method of clause 154, wherein the antimicrobial composition comprises cupric oxide.

162. The method of clause 154, wherein the antimicrobial composition comprises an ingredient selected from the group consisting of zinc oxide, silver, alumina, cuprous oxide, cupric oxide, and any combination thereof.

163. The method of clause 154, wherein the antimicrobial composition is present at a concentration between 0.1% to 40% (w/w).

164. The method of clause 154, wherein the antimicrobial composition is present at a concentration between 0.1% to 10% (w/w).

165. The method of clause 154, wherein the antimicrobial composition is present at a concentration of 10% (w/w).

166. The method of clause 154, wherein the antimicrobial composition is present at a concentration between 1% to 10% (w/w).

167. The method of clause 154, wherein the antimicrobial composition is present at a concentration between 10% to 20% (w/w).

168. The method of clause 154, wherein the antimicrobial composition is present at a concentration between 20% to 30% (w/w).

169. The method of clause 154, wherein the antimicrobial composition is present at a concentration between 30% to 40% (w/w).

170. The method of clause 154, wherein the composite material comprises an epoxy-based composite.

171. The method of clause 154, wherein the composite material comprises a resin-based composite.

172. The method of clause 154, wherein the composite material comprises a carbon fiber.

173. The method of clause 154, wherein the composite material comprises a fiber-reinforced plastic.

174. The method of clause 173, wherein the fiber-reinforced plastic comprises a polymer matrix and fibers.

175. The method of clause 174, wherein the polymer matrix comprises a thermoset polymer.

176. The method of clause 174, wherein the polymer matrix comprises a polyester resin, a polyurethane, vulcanized rubber, duroplast, a melamine resin, diallyl-phthalate (DAP), an epoxy resin, a benzoxazine, a polyimide, a cyanate ester, furan, thiolyte, a vinyl ester resin, and any combination thereof.

177. The method of clause 174, wherein the polymer matrix comprises a polyester resin.

178. The method of clause 174, wherein the polymer matrix comprises a polyurethane.

179. The method of clause 174, wherein the polymer matrix comprises vulcanized rubber.

180. The method of clause 174, wherein the polymer matrix comprises duroplast.

181. The method of clause 174, wherein the polymer matrix comprises a melamine resin.

182. The method of clause 174, wherein the polymer matrix comprises diallyl-phthalate (DAP).

183. The method of clause 174, wherein the polymer matrix comprises an epoxy resin.

184. The method of clause 174, wherein the polymer matrix comprises a benzoxazine.

185. The method of clause 174, wherein the polymer matrix comprises a polyimide.

186. The method of clause 174, wherein the polymer matrix comprises a cyanate ester.

187. The method of clause 174, wherein the polymer matrix comprises furan.

188. The method of clause 174, wherein the polymer matrix comprises thiolyte.

189. The method of clause 174, wherein the polymer matrix comprises a vinyl ester resin.

190. The method of clause 174, wherein the fibers comprise glass, carbon, aramid, basalt, and any combination thereof.

191. The method of clause 174, wherein the fibers comprise glass.

192. The method of clause 174, wherein the fibers comprise carbon.

193. The method of clause 174, wherein the fibers comprise aramid.

194. The method of clause 174, wherein the fibers comprise basalt.

195. The method of clause 154, wherein the composite material comprises fiberglass.

196. A method of making an antifoulant composition, said method comprising the step of combining an antimicrobial composition and one or more polymers and molding the antifoulant composition from the combination of the antimicrobial composition and the polymer.

197. The method of clause 196, wherein the antimicrobial composition is a powder.

198. The method of clause 196, wherein the polymer is a powder.

199. The method of clause 196, wherein the combination of the antimicrobial composition and the polymer is performed prior to curing the antifoulant composition.

200. The method of clause 196, wherein the molding is performed via a rotational molding composition.

201. The method of clause 196, wherein the molding is performed via extrusion.

202. The method of clause 196, wherein the antimicrobial composition comprises zinc.

203. The method of clause 196, wherein the antimicrobial composition comprises zinc oxide.

204. The method of clause 196, wherein the antimicrobial composition comprises copper.

205. The method of clause 196, wherein the antimicrobial composition comprises silver.

206. The method of clause 196, wherein the antimicrobial composition comprises alumina.

207. The method of clause 196, wherein the antimicrobial composition comprises cuprous oxide.

208. The method of clause 196, wherein the antimicrobial composition comprises cupric oxide.

209. The method of clause 196, wherein the antimicrobial composition comprises an ingredient selected from the group consisting of zinc oxide, silver, alumina, cuprous oxide, cupric oxide, and any combination thereof.

210. The method of clause 196, wherein the antimicrobial composition is present at a concentration between 0.1% to 40% (w/w).

211. The method of clause 196, wherein the antimicrobial composition is present at a concentration between 0.1% to 10% (w/w).

212. The method of clause 196, wherein the antimicrobial composition is present at a concentration of 10% (w/w).

213. The method of clause 196, wherein the antimicrobial composition is present at a concentration between 1% to 10% (w/w).

214. The method of clause 196, wherein the antimicrobial composition is present at a concentration between 10% to 20% (w/w).

215. The method of clause 196, wherein the antimicrobial composition is present at a concentration between 20% to 30% (w/w).

216. The method of clause 196, wherein the antimicrobial composition is present at a concentration between 30% to 40% (w/w).

217. The method of clause 196, wherein the polymer comprises a thermoplastic polymer.

218. The method of clause 196, wherein the polymer comprises an extruded polymer.

219. The method of clause 196, wherein the polymer comprises polyacrylic acid (PAA), poly(methyl methacrylate) (PMMA), acrylonitrile butadiene styrene (ABS), polyamide, polylactic acid (PLA), polybenzimidazole (PBI), polycarbonate (PC), polyether sulfone (PES), polyoxymethylene (POM), polyether ether ketone (PEEK), polyetherimide (PEI), polyphenylene oxide (PPO), polyphenylene sulfide (PPS), polypropylene (PP), polystyrene (PS), polyvinyl chloride (PVC), polyvinylidene fluoride (PVDF), polytetrafluoroethylene (PTFE), and any combination thereof.

220. The method of clause 196, wherein the polymer comprises polyethylene.

221. The method of clause 196, wherein the polymer comprises high density polyethylene (HDPE).

222. The method of clause 196, wherein the polymer comprises low density polyethylene (LDPE).

223. The method of clause 196, wherein the polymer comprises polyacrylic acid (PAA).

224. The method of clause 196, wherein the polymer comprises poly(methyl methacrylate) (PMMA).

225. The method of clause 196, wherein the polymer comprises acrylonitrile butadiene styrene (ABS).

226. The method of clause 196, wherein the polymer comprises polyamide.

227. The method of clause 196, wherein the polymer comprises polylactic acid (PLA).

228. The method of clause 196, wherein the polymer comprises polybenzimidazole (PBI).

229. The method of clause 196, wherein the polymer comprises polycarbonate (PC).

230. The method of clause 196, wherein the polymer comprises polyether sulfone (PES).

231. The method of clause 196, wherein the polymer comprises polyoxymethylene (POM).

232. The method of clause 196, wherein the polymer comprises polyether ether ketone (PEEK).

233. The method of clause 196, wherein the polymer comprises polyetherimide (PEI).

234. The method of clause 196, wherein the polymer comprises polyphenylene oxide (PPO).

235. The method of clause 196, wherein the polymer comprises polyphenylene sulfide (PPS).

236. The method of clause 196, wherein the polymer comprises polypropylene (PP).

237. The method of clause 196, wherein the polymer comprises polystyrene (PS).

238. The method of clause 196, wherein the polymer comprises polyvinyl chloride (PVC).

239. The method of clause 196, wherein the polymer comprises polyvinylidene fluoride (PVDF).

240. The method of clause 196, wherein the polymer comprises polytetrafluoroethylene (PTFE).

241. A method of making an antifoulant composition, said method comprising the step of combining an antimicrobial composition and one or more composite materials and molding the antifoulant composition from the combination of the antimicrobial composition and the composite material.

242. The method of clause 241, wherein the antimicrobial composition is a powder.

243. The method of clause 241, wherein the composite material is a liquid.

244. The method of clause 241, wherein the combination of the antimicrobial composition and the composite material is performed prior to curing the antifoulant composition.

245. The method of clause 241, wherein the antimicrobial composition comprises zinc.

246. The method of clause 241, wherein the antimicrobial composition comprises zinc oxide.

247. The method of clause 241, wherein the antimicrobial composition comprises copper.

248. The method of clause 241, wherein the antimicrobial composition comprises silver.

249. The method of clause 241, wherein the antimicrobial composition comprises alumina.

250. The method of clause 241, wherein the antimicrobial composition comprises cuprous oxide.

251. The method of clause 241, wherein the antimicrobial composition comprises cupric oxide.

252. The method of clause 241, wherein the antimicrobial composition comprises an ingredient selected from the group consisting of zinc oxide, silver, alumina, cuprous oxide, cupric oxide, and any combination thereof.

253. The method of clause 241, wherein the antimicrobial composition is present at a concentration between 0.1% to 40% (w/w).

254. The method of clause 241, wherein the antimicrobial composition is present at a concentration between 0.1% to 10% (w/w).

255. The method of clause 241, wherein the antimicrobial composition is present at a concentration of 10% (w/w).

256. The method of clause 241, wherein the antimicrobial composition is present at a concentration between 1% to 10% (w/w).

257. The method of clause 241, wherein the antimicrobial composition is present at a concentration between 10% to 20% (w/w).

258. The method of clause 241, wherein the antimicrobial composition is present at a concentration between 20% to 30% (w/w).

259. The method of clause 241, wherein the antimicrobial composition is present at a concentration between 30% to 40% (w/w).

260. The method of clause 241, wherein the composite material comprises an epoxy-based composite.

261. The method of clause 241, wherein the composite material comprises a resin-based composite.

262. The method of clause 241, wherein the composite material comprises a carbon fiber.

263. The method of clause 241, wherein the composite material comprises a fiber-reinforced plastic.

264. The method of clause 263, wherein the fiber-reinforced plastic comprises a polymer matrix and fibers.

265. The method of clause 264, wherein the polymer matrix comprises a thermoset polymer.

266. The method of clause 264, wherein the polymer matrix comprises a polyester resin, a polyurethane, vulcanized rubber, duroplast, a melamine resin, diallyl-phthalate (DAP), an epoxy resin, a benzoxazine, a polyimide, a cyanate ester, furan, thiolyte, a vinyl ester resin, and any combination thereof.

267. The method of clause 264, wherein the polymer matrix comprises a polyester resin.

268. The method of clause 264, wherein the polymer matrix comprises a polyurethane.

269. The method of clause 264, wherein the polymer matrix comprises vulcanized rubber.

270. The method of clause 264, wherein the polymer matrix comprises duroplast.

271. The method of clause 264, wherein the polymer matrix comprises a melamine resin.

272. The method of clause 264, wherein the polymer matrix comprises diallyl-phthalate (DAP).

273. The method of clause 264, wherein the polymer matrix comprises an epoxy resin.

274. The method of clause 264, wherein the polymer matrix comprises a benzoxazine.

275. The method of clause 264, wherein the polymer matrix comprises a polyimide.

276. The method of clause 264, wherein the polymer matrix comprises a cyanate ester.

277. The method of clause 264, wherein the polymer matrix comprises furan.

278. The method of clause 264, wherein the polymer matrix comprises thiolyte.

279. The method of clause 264, wherein the polymer matrix comprises a vinyl ester resin.

280. The method of clause 264, wherein the fibers comprise glass, carbon, aramid, basalt, and any combination thereof.

281. The method of clause 264, wherein the fibers comprise glass.

282. The method of clause 264, wherein the fibers comprise carbon.

283. The method of clause 264, wherein the fibers comprise aramid.

284. The method of clause 264, wherein the fibers comprise basalt.

285. The method of clause 241, wherein the composite material comprises fiberglass.

Example 1

Preparation of Antifoulant Compositions Comprising Polymers

The instant example describes preparation of antifoulant compositions comprising an antimicrobial composition and one or more polymers.

Various antimicrobial compositions were utilized, including zinc (44 micron, Belmont Metals, 8024A), zinc oxide (44 micron, ZoChem, ZOX-800), and zinc pyrithione (5 micron, TCI, M0633). Furthermore, a combination of silver (CAS 7440-22-4), alumina powder (CAS 1344-28-1), and zinc oxide (CAS 1314-13-2) was also utilized as an antimicrobial composition.

The antimicrobial composition and polymer were incorporated directly in the manufacturing process. This provides an advantage as an external coating was not necessary and also allows for a larger matrix which will hold greater amounts of antimicrobial composition and increase the lifespan of the biofilm protection. For the instant example, high density polyethylene (HDPE) was used as the exemplary polymer and rotational molding was utilized for fabrication of the antifoulant composition.

Antifoulant compositions comprising HDPE were prepared using a lab-scale rotational molder and each sample contained 900 grams of HDPE dry powder. The HDPE was combined with various antimicrobials, including zinc pyrithione at 10% and silver/alumina/zinc oxide at 10%. A control (no antimicrobial added) was also prepared.

The antimicrobial powder was combined with dry HDPE. The combination was then poured into a mold, rotationally lined at 350 degrees Fahrenheit for 8 hours, and then slowly cooled for two hours. The antifoulant compositions were cut to microbiological testing facility specifications (one set at 2×2×0.5 inches and another set at 12×6×0.25 inches).

Example 2

Preparation of Antifoulant Compositions Comprising Composite Materials

The instant example describes preparation of antifoulant compositions comprising an antimicrobial composition and one or more composite materials.

Various antimicrobial compositions were utilized, including zinc (44 micron, Belmont Metals, 8024A), zinc oxide (44 micron, ZoChem, ZOX-800), and zinc pyrithione (5 micron, TCI, M0633). Furthermore, a combination of silver (CAS 7440-22-4), alumina powder (CAS 1344-28-1), and zinc oxide (CAS 1314-13-2) was also utilized as an antimicrobial composition.

The antimicrobial composition and composite material were incorporated directly in the manufacturing process. This provides an advantage as an external coating was not necessary and also allows for a larger matrix which will hold greater amounts of antimicrobial composition and increase the lifespan of the biofilm protection. For the instant example, fiberglass was used as the exemplary composite material and "laying up" of structural fiberglass components for fabrication of the antifoulant composition.

The fiberglass was combined with various antimicrobials, including silver/alumina/zinc oxide at 10% as well as a control (no antimicrobial added). The antimicrobial was added while the plasticizer of the fiberglass was in liquid form and before the fiber was added to the fiberglass (e.g., before the curing process began). The control antifoulant composition and the antifoulant compositions comprising silver/alumina/zinc oxide at 10% were cut according microbiological testing facility specifications (one set at 2×2×0.5 inches and another set at 12×6×0.2 inches).

Example 3

Antimicrobial Testing—Cytotoxic Potential (ASTM F895)

The instant example evaluated various antimicrobial compositions for cytotoxic potential. Briefly, ASTM F895 is a test method useful for assessing the cytotoxic potential of new materials and formulations and as part of a quality control program for established medical devices and components. Qualitative results of the potency of various antimicrobial compositions were evaluated using this test method.

Antimicrobial compositions including zinc, zinc oxide, zinc pyrithione, and silver/alumina/zinc oxide were poured into several wells that had been punched into inoculated agar. The testing wells were then compared to one another based on the zone of inhibition of cell or spore growth created for each well. Petri dishes were place in an incubator at 78° F. for 24 hours. The zones of inhibition around each well were then compared and the best two antimicrobial compositions from this example were utilized in subsequent testing.

FIG. 1 shows results of the agar diffusion tests on *Escherichia coli*. The control antifoulant composition did not show antimicrobial activity on the bacterial strain. Samples treated with the antimicrobial compositions zinc oxide, zinc pyrithione, and silver/alumina/zinc oxide demonstrated efficacy in inhibiting bacterial growth per the visible zone region created around the sample.

Example 4

Antimicrobial Testing—Antimicrobial Activity Under Dynamic Contact Conditions (ASTM E2149-13a)

The instant example evaluated various antifoulant compositions for antimicrobial activity under dynamic contact conditions. Briefly, ASTM E2149-13a is a test standard for determining antimicrobial activity of antimicrobial compositions under dynamic contact conditions. The 2×2 inch antifoulant composition samples from Example 1 and Example 2 were placed in sterilized 500 mL flasks with 100 mL of distilled water.

For antifoulant compositions comprising a polymer, *Staphylococcus aureus* (gram-positive bacteria) were added to each flask at $3 \times 10^6$ VC/mL. For antifoulant compositions comprising a composite material, *Escherichia coli* (gram-negative bacteria) were added to each flask at approximately $1 \times 10^6$ cells/mL. Three samples (0.1 mL each) were taken immediately from each flask and spread on TSA plates. The flasks were incubated in a 37° C. shaking incubator at 200 rpm. Three samples (0.1 mL each) were removed and plated at 1 hour intervals for three hours. Plates were left for growth at 25° C. for 60 hours. Colonies were counted using Sphere Flash and the average VC/mL or colony forming units (CFU) were documented.

Figure 2:
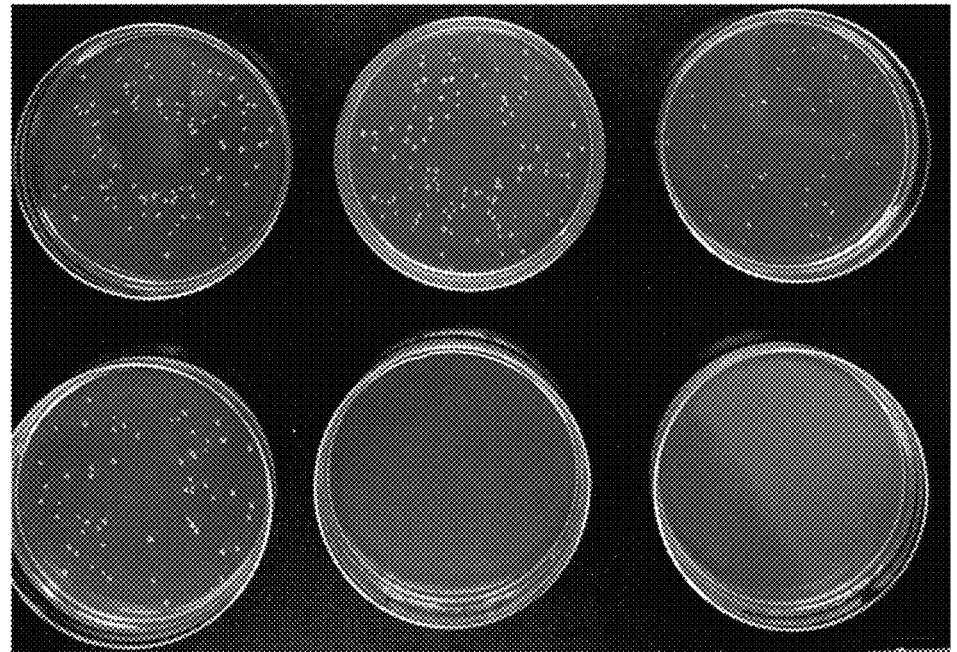
FIG. 2 shows colony counts for dynamic shaker test on *S. aureus* for control (top row) and for silver/alumina/zinc oxide (bottom row).
Figure 3:
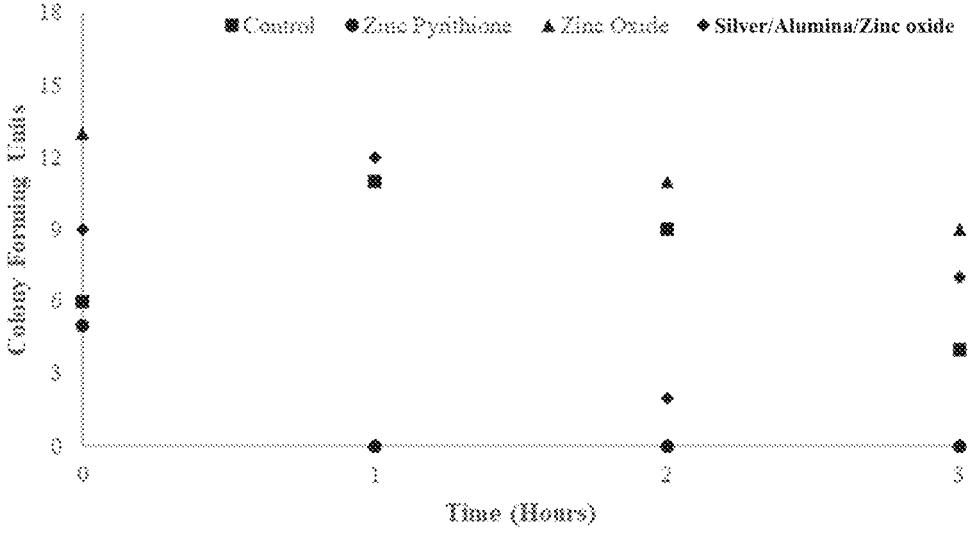
FIG. 3 shows colony forming unit evaluations per time for dynamic shaker tests on *S. aureus* for antifoulant compositions comprising HDPE.

FIGS. 2 and 3 demonstrate efficacy of antifoulant compositions comprising a polymer. In FIG. 2, bacteria enumeration tests are shown following quantitative antibacterial tests on *S. aureus*. The top row of samples in FIG. 2 shows the control at 1 hour, 2 hours, and 3 hours (left to right). The plates experience a natural cell death over the course of three hours.

The bottom row of samples in FIG. 2 shows cell growth from the antifoulant compositions comprising the silver/alumina/zinc oxide antimicrobial composition at 1 hour, 2 hours, and 3 hours (left to right). As shown, *S. aureus* bacteria is completely neutralized by the second hour. A significant reduction in colony number is clearly visible for the treated samples in comparison with the control samples.

FIG. 3 displays the graphed results of the antimicrobial efficacy of antifoulant compositions comprising a polymer under dynamic flow conditions. The antimicrobial compositions tested included zinc oxide, zinc pyrithione, and silver/alumina/zinc oxide. The results in FIG. 3 indicate that zinc pyrithione and silver/alumina/zinc oxide are the most efficacious antimicrobials comprising a polymer under these test parameters.

The antibacterial efficacy of the zinc pyrithione was 99.9% for *S. aureus* in dynamic fluid conditions. FIG. 3 shows results with silver/alumina/zinc oxide incorporated at 0.5%, and as shown resists the bacterial growth for two hours before growing again. It is contemplated that this could be due to low amounts of antimicrobial composition which did not result in a homogenous blend when forming the antifoulant composition.

Figure 4:
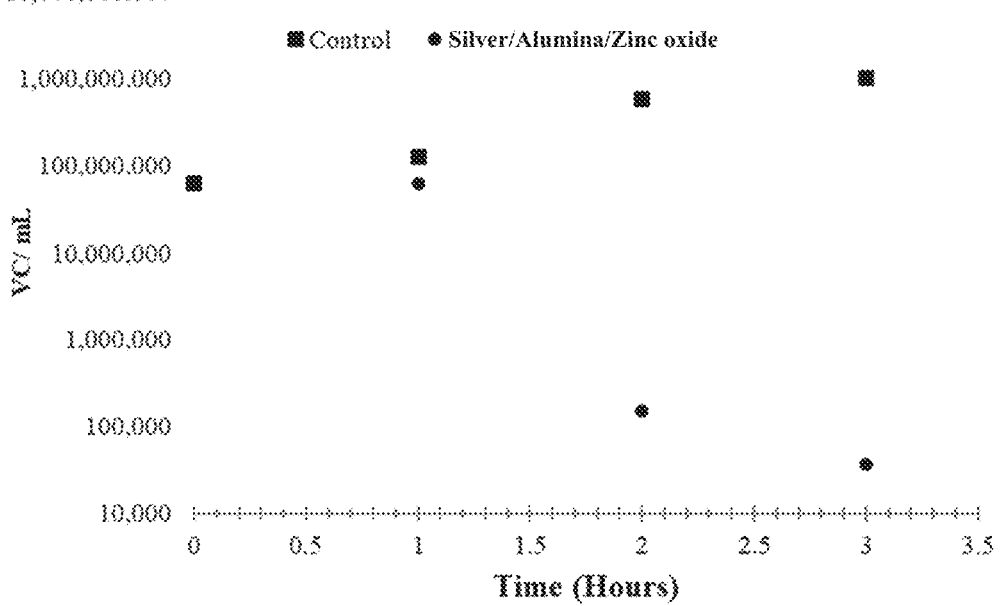
FIG. 4 shows colony evaluations per time for dynamic shaker tests on *S. aureus* for antifoulant compositions comprising HDPE and silver/alumina/zinc oxide at 10%.

FIG. 4 shows the results of the antimicrobial efficacy of antifoulant compositions comprising a polymer under dynamic flow conditions, with the silver/alumina/zinc oxide increased to 10%. After the first hour, the antifoulant composition with 10% silver/alumina/zinc oxide and the control antifoulant composition had similar counts. The most dramatic change was shown to occur between two and three hours of exposure, when the antifoulant composition with 10% silver/alumina/zinc oxide begins to significantly lower the *S. aureus* cell counts. After three hours, the antifoulant composition with 10% silver/alumina/zinc oxide demonstrated an efficacy of 99.0% in reducing *S. aureus* cell counts.

Table 1 shows results of the antimicrobial efficacy of antifoulant compositions comprising a composite material when exposed to dynamic flow conditions. Each antifoulant composition comprises an antimicrobial composition of silver/alumina/zinc oxide at 10% by weight.

TABLE 1

| Antifoulant Composition | *Escherichia coli* | | | |
|---|---|---|---|---|
| (antimicrobial composition) | VC/mL @1 hr | VC/mL @2 hr | VC/mL @3 hr | Antibacterial Efficacy (%) |
| Fiberglass (control) | $1.06 \times 10^6$ | $9.6 \times 10^5$ | $6.4 \times 10^5$ | — |
| Fiberglass (10% silver/ alumina/zinc) | $1.71 \times 10^5$ | $5.3 \times 10^4$ | 0 | 99.9% |
| Fiberglass (10% silver/ alumina/zinc) | $7.8 \times 10^6$ | $1.25 \times 10^5$ | 0 | 99.9% |

Figure 5:
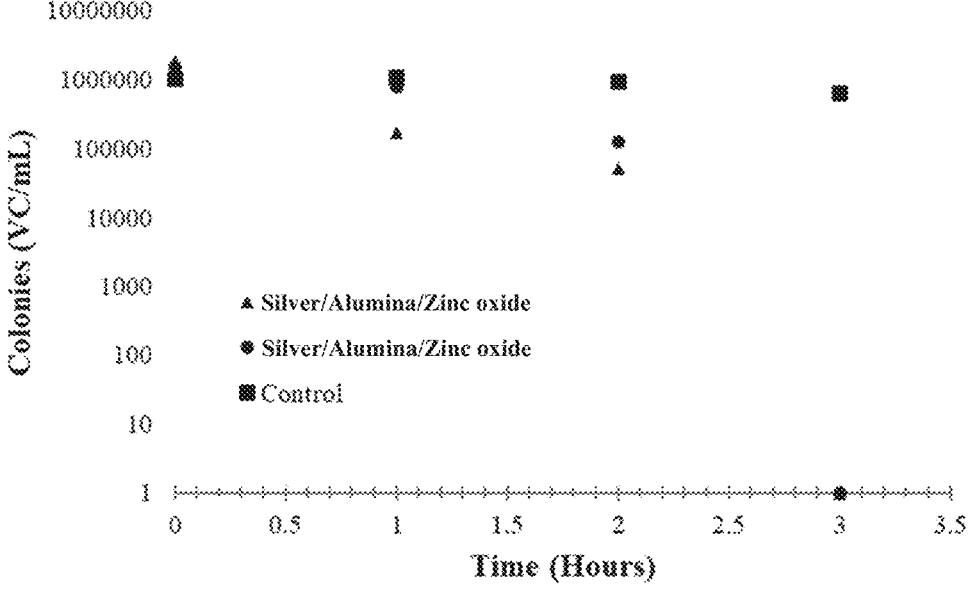
FIG. 5 shows dynamic shaker tests on *E. coli* for antifoulant compositions comprising fiberglass and silver/alumina/zinc oxide at 10%.

FIG. 5 shows quantitative results for efficacy on *E. coli* of antifoulant compositions comprising a composite material comprising 10% silver/alumina/zinc oxide. As shown for the control composition, *E. coli* experienced a minimal natural death over the three-hour span. The antifoulant compositions comprising fiberglass were duplicated and both showed the same rates of depletion during the same timeframe indicating high repeatability. Similar to the antifoulant compositions comprising the HDPE polymer, there was minimal change after one hour of silver/alumina/zinc oxide exposure to *E. coli*. The rate was most significant between two and three hours, demonstrating antimicrobial efficacy of 99.9% using 10% silver/alumina/zinc oxide.

*E. coli* is a gram-negative bacteria that has a more complicated cell wall structure which makes this bacteria more difficult to penetrate and mitigate. In contrast, *S. aureus* is a gram positive bacteria and is naturally more susceptible to antimicrobials and, thus, may be easier to control. Furthermore, the surface roughness of fiberglass compared to HDPE compositions could result in a change in release rate of antimicrobial between the two materials. Laboratory testing indicated that the zinc pyrithione and silver/alumina/zinc oxide showed the highest efficacies and performance with both gram-positive and gram-negative bacteria.

Example 5

Antimicrobial Testing—Antifoulant Compositions in Shallow Water Submergence (ASTM D3623-78a)

The instant example evaluated various antifoulant compositions for antimicrobial activity in shallow water submergence. Briefly, ASTM D3623-78a is a test is used to evaluate antifouling panels in shallow submergence.

Sacred Heart Marine Research Center (SHMRC) is a primary test facility for immersion and is located in Karrapad Cove or Tuticorin Bay in southern India. This facility is in close proximity to the floating test platforms in the protected bay area and enables SHMRC to expand its research and testing capabilities in marine coatings evaluation and marine research. Antifoulant compositions were sent to SHMRC to be submerged in a static immersion test per ASTM D3623-78a.

Static immersion provides validation of the efficacy of materials against fouling. The primary fouling organism utilized in the testing is the barnacle (*Balanus amphitrite amphitrite* Darwin), which is the most common fouling organism found around the world. Seawater temperature remains above 200 degrees Celsius all year and reaches as high as 350 degrees Celsius. The 12×6 inch antifoulant composition samples from Examples 1 and 2 were placed two feet below the surface of the water and inspected once a month for growth, both qualitatively and quantitatively.

Figure 6:
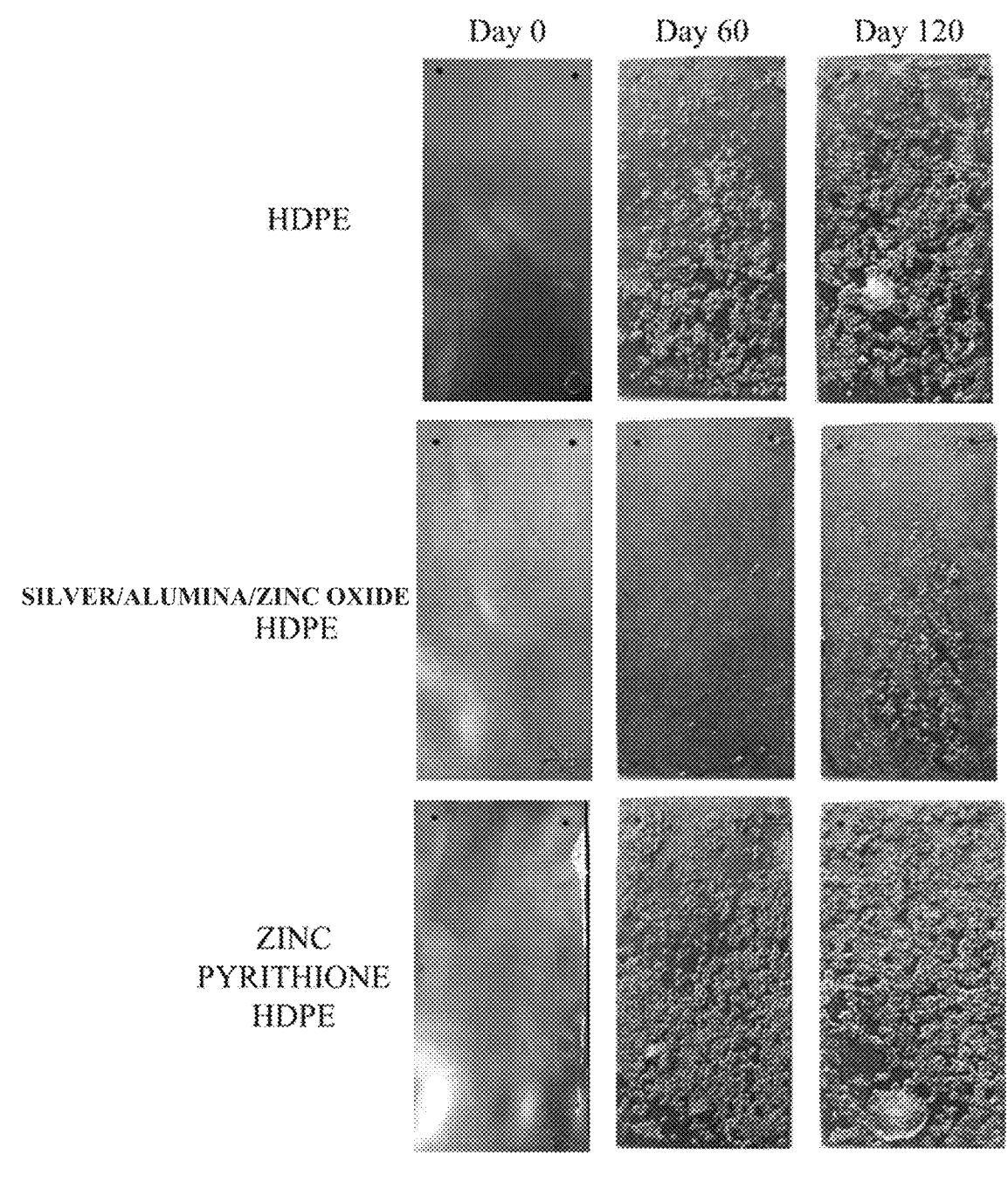
FIG. 6 shows static submersion tests on marine growth and fouling for antifoulant compositions comprising HDPE.

FIG. 6 shows the results of field testing for antifoulant compositions comprising a polymer. The antifoulant compositions of Example 1 were rotationally molded using either zinc pyrithione or silver/alumina/zinc oxide. A control antifoulant composition containing no antimicrobial composition was also formed. The various antifoulant compositions were placed in shallow submersion tests.

On day 120 after submersion, the control antifoulant composition showed significant attachment of barnacles, mollusks and oysters (see FIG. 5, top panels). The antifoulant composition comprising HDPE and zinc pyrithione at 10% shows marine growth and is covered with fouling. However, the antifoulant composition comprising HDPE and silver/alumina/zinc oxide at 10% showed minimal attachment of marine life or and little to no fouling on its surface.

Figure 7:
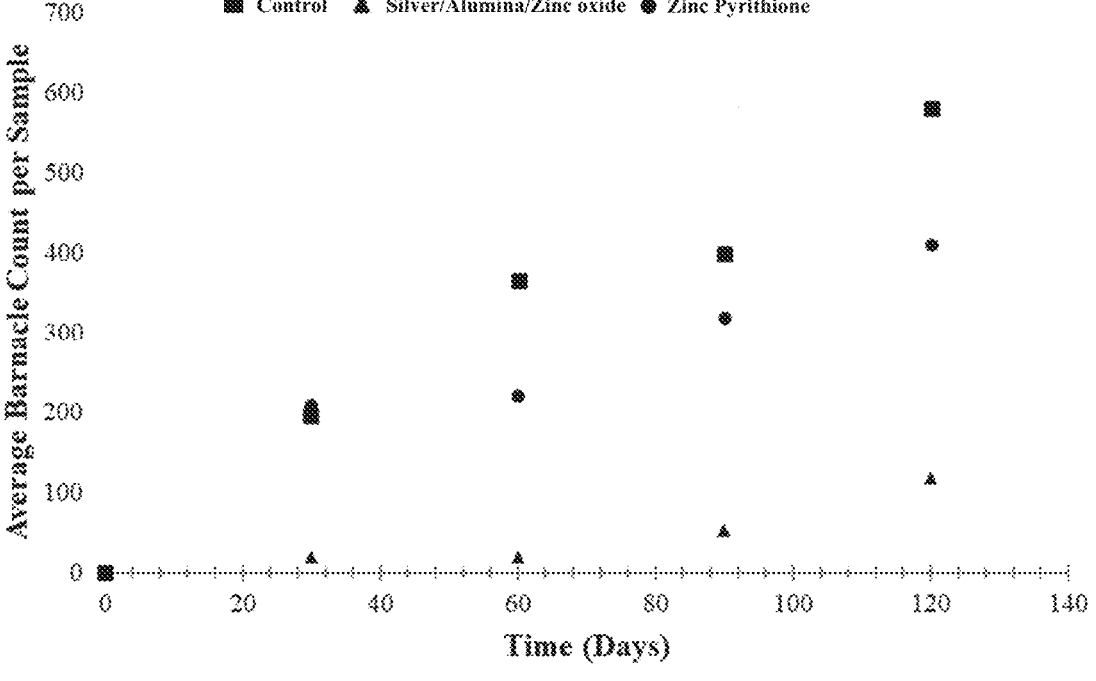
FIG. 7 shows average barnacle attachment per surface side over time for antifoulant compositions comprising HDPE.

SHMRC reported the number of barnacle on either side of the antifoulant composition surfaces, the maximum diameter of barnacles on each side of the antifoulant compositions, and the number of oysters attached to the surface of the antifoulant compositions on a monthly basis. The average number of barnacles on each antifoulant composition is shown at FIG. 7. The antifoulant composition comprising HDPE and zinc pyrithione collected the largest number of barnacles compared to other antifoulant composition, numbering 208 barnacles per side after 30 days.

Each antifoulant composition experienced some marine growth at different times over the 120 days. The control antifoulant composition and the antifoulant composition comprising zinc pyrithione demonstrated the largest accumulation during the first month. The antifoulant composition comprising HDPE and silver/alumina/zinc oxide showed a delayed growth of marine life until 90 days, when a slight increase was observed. Reports also showed evidence of barnacles detaching from the antifoulant compositions comprising HDPE and the antifoulant compositions comprising silver/alumina/zinc oxide.

Figure 8:
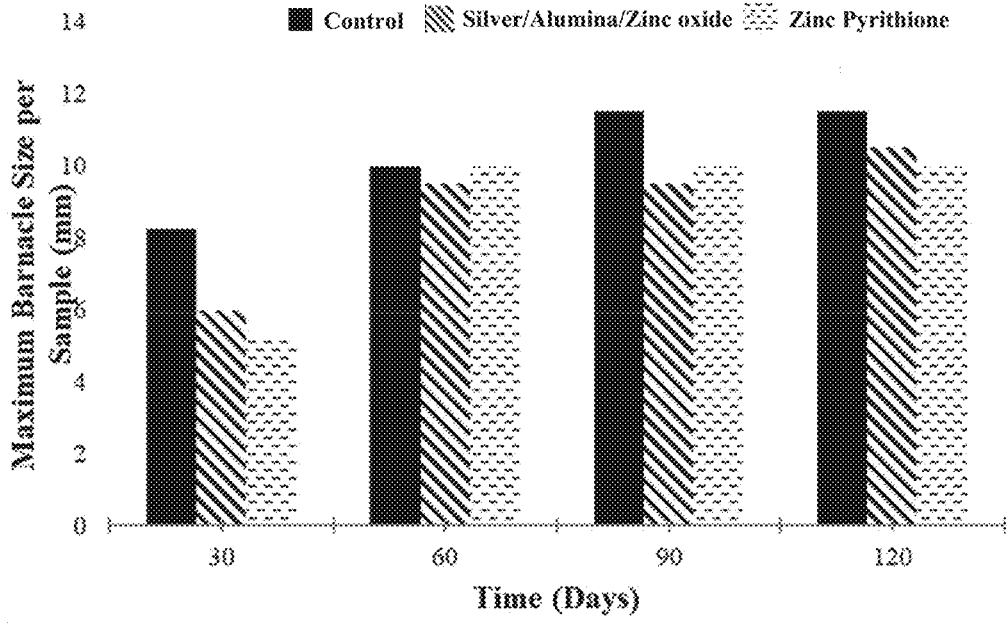
FIG. 8 shows maximum barnacle size over time for antifoulant compositions comprising HDPE.

FIG. 6 and FIG. 7 demonstrate that the largest barnacles resided on the control antifoulant composition, indicating that the barnacles had time to attach and grow over the duration of the study. FIG. 8 shows the maximum barnacle size per sample over time. As the results were reported monthly, it was possible to track a single barnacle for attachment and growth, thus permitting an indication of duration of attachment.

It is hypothesized that the barnacles on the antifoulant compositions comprising HDPE and an antimicrobial composition took longer to determine attachment compared to the control antimicrobial composition. Results from a duration of 120 days show that even though barnacles were attached since day 30, the barnacles had not yet grown to the size of 12 mm as shown on the control antimicrobial composition. Based on 120 days of observation in ocean water, antimicrobial compositions comprising HDPE and zinc pyrithione reduced barnacle growth by 8.7%. Further, antimicrobial composition comprising HDPE and silver/alumina/zinc oxide restricted barnacle growth by 13%. As a result in the reduction of attachment and grow rate of the barnacles, hard shell fouling of the antifoulant compositions can also be reduced.

Figure 9:
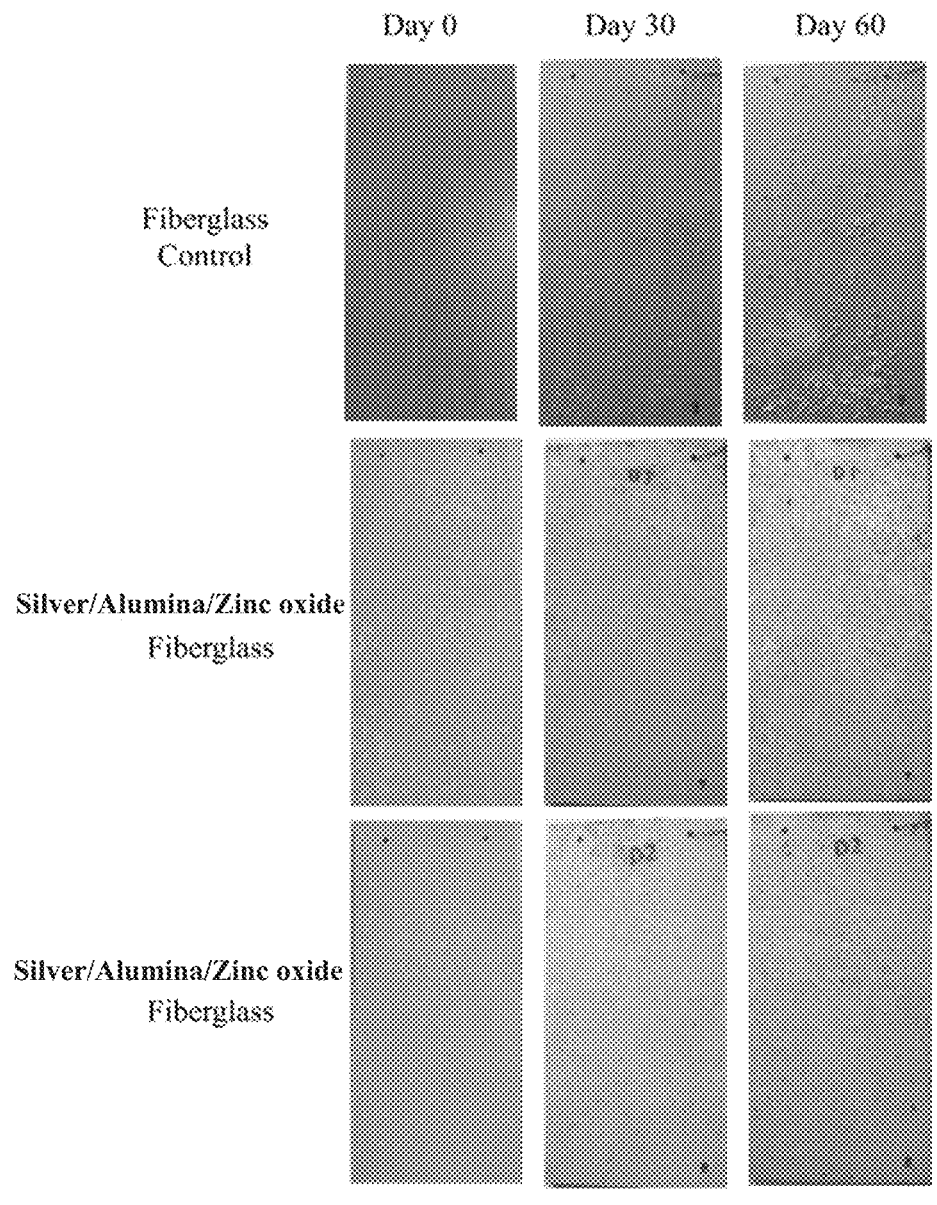
FIG. 9 shows static submersion tests on marine growth and fouling for antifoulant compositions comprising fiberglass.

The antifoulant compositions comprising silver/alumina/zinc oxide provided the most effective inhibition of marine life attachment and growth per the visible accumulation on the antifoulant composition surface. The antifoulant compositions of Example 2 were also evaluated via SHMRC in Tuticorin Bay. In particular, antifoulant compositions comprising fiberglass and silver/alumina/zinc oxide at 10% were tested. FIG. 9 displays the results of fouling efficacy for antifoulant compositions comprising fiberglass after 60 days of static immersion testing. The top panel of FIG. 9 shows control antifoulant compositions with no antimicrobial composition while the middle and bottom panels show antifoulant compositions comprising silver/alumina/zinc oxide.

Figure 10:
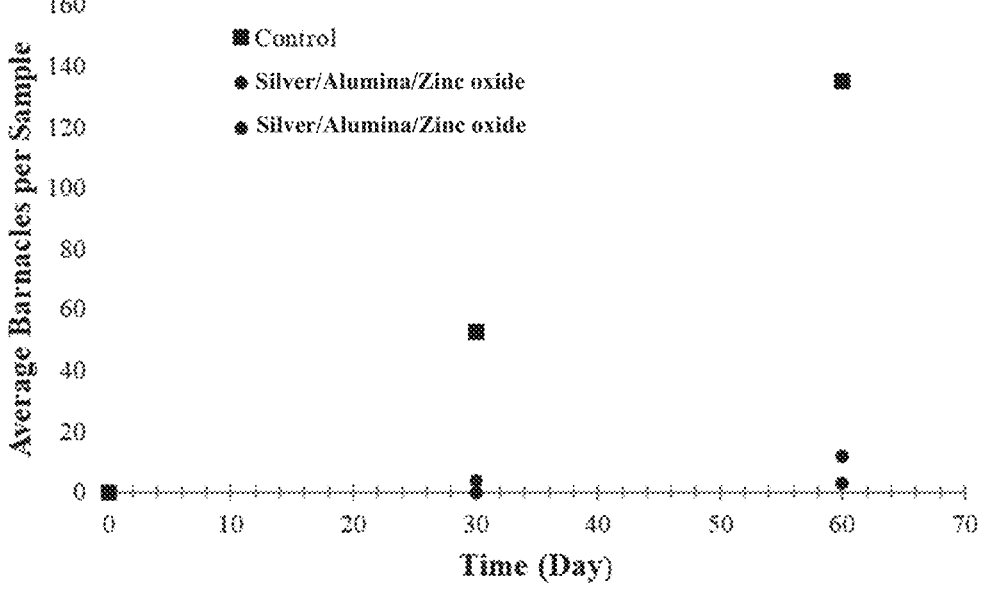
FIG. 10 shows average barnacle attachment per surface side over time for antifoulant compositions comprising fiberglass.

Similar to the observations with antifoulant compositions comprising HDPE, FIG. 9 shows antifoulant compositions comprising fiberglass and silver/alumina/zinc oxide demonstrated hardly any marine life on their surfaces after 60 days of submergence. Further, FIG. 10 displays results for barnacle attachment on antifoulant compositions comprising fiberglass and silver/alumina/zinc oxide at 10%. The samples demonstrate a similar trend after an eight week timeframe with an average of 7.25 barnacles on antifoulant compositions comprising fiberglass and silver/alumina/zinc oxide and 135 barnacles on antifoulant compositions comprising fiberglass and no antimicrobial composition.

SHMRC also reported the number of oysters that attached to the antifoulant compositions over time. Oyster larvae navigate waters freely until a suitable location for growth is determined. Generally, the oyster larvae attach to a surface that has a healthy biofilm development that serves as food and a platform for attachment. Both antifoulant compositions comprising silver/alumina/zinc oxide at 10% (i.e., antifoulant compositions comprising HDPE and antifoulant compositions comprising fiberglass) demonstrated no oyster attachment and growth. In comparison, control antifoulant compositions (i.e., with no antimicrobial compositions) demonstrated attachment of oysters. These results indicate that silver/alumina/zinc oxide preserves the surface of the antifoulant compositions by preventing the initial development of a biofilm where marine life can attach and grow to eventually cause failure.

What is claimed is:

1. An antifoulant composition comprising i) an antimicrobial composition and ii) one or more polymers, wherein at least a portion of the one or more polymers are extruded, wherein the one or more polymers comprise polyacrylic acid (PAA), poly(methyl methacrylate) (PMMA), acrylonitrile butadiene styrene (ABS), polyamide, polylactic acid (PLA), polybenzimidazole (PBI), polycarbonate (PC), polyether sulfone (PES), polyoxymethylene (POM), polyether ether ketone (PEEK), polyetherimide (PEI), polyphenylene oxide (PPO), polyphenylene sulfide (PPS), polypropylene (PP), polystyrene (PS), polyvinyl chloride (PVC), polyvinylidene fluoride (PVDF), polytetrafluoroethylene (PTFE), or any combination thereof, and wherein the antimicrobial composition is a mixture wherein the mixture includes antimicrobial components consisting of silver, alumina, and zinc oxide.

2. The antifoulant composition of claim 1, wherein the one or more polymers is a thermoplastic polymer.

3. The antifoulant composition of claim 1, wherein the one or more polymers further comprise polyethylene.

4. The antifoulant composition of claim 1, wherein the one or more polymers further high density polyethylene (HDPE).

5. An antifoulant composition comprising i) an antimicrobial composition and ii) one or more composite materials, wherein the antimicrobial composition is a mixture wherein the mixture includes antimicrobial components consisting of silver, alumina, and zinc oxide.

6. The antifoulant composition of claim 5, wherein the composite material comprises an epoxy-based composite.

7. The antifoulant composition of claim 5, wherein the composite material comprises a resin-based composite.

8. The antifoulant composition of claim 5, wherein the composite material comprises a fiber-reinforced plastic.

9. The antifoulant composition of claim 1, wherein the antimicrobial composition is present at a concentration between 0.1% to 10% (w/w).

10. The antifoulant composition of claim 1, wherein the antimicrobial composition is present at a concentration between 10% to 20% (w/w).

11. The antifoulant composition of claim 5, wherein the antimicrobial composition is present at a concentration between 0.1% to 10% (w/w).

12. The antifoulant composition of claim 5, wherein the antimicrobial composition is present at a concentration between 10% to 20% (w/w).

13. The antifoulant composition of claim 1, wherein the silver is present at between 5 microns and 44 microns in size.

14. The antifoulant composition of claim 1, wherein the alumina is present at between 5 microns and 44 microns in size.

15. The antifoulant composition of claim 1, wherein the zinc oxide is present at between 5 microns and 44 microns in size.

16. The antifoulant composition of claim 1, wherein the antimicrobial composition is present at a concentration between 0.1% to 10% (w/w).

17. The antifoulant composition of claim 1, wherein the antimicrobial composition is present at a concentration between 10% to 20% (w/w).

18. The antifoulant composition of claim 5, wherein the silver is present at between 5 microns and 44 microns in size.

19. The antifoulant composition of claim 5, wherein the alumina is present at between 5 microns and 44 microns in size.

20. The antifoulant composition of claim 5, wherein the zinc oxide is present at between 5 microns and 44 microns in size.

* * * * *